(12) United States Patent
Ooba

(10) Patent No.: US 12,035,038 B2
(45) Date of Patent: *Jul. 9, 2024

(54) CAMERA APPARATUS

(71) Applicant: SONY GROUP CORPORATION, Tokyo (JP)

(72) Inventor: Yuuji Ooba, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/152,215

(22) Filed: Jan. 10, 2023

(65) Prior Publication Data

US 2023/0164429 A1 May 25, 2023

Related U.S. Application Data

(63) Continuation of application No. 17/400,050, filed on Aug. 11, 2021, now Pat. No. 11,588,973, which is a
(Continued)

(30) Foreign Application Priority Data

Jan. 16, 2014 (JP) ................................. 2014-005577

(51) Int. Cl.
*H04N 23/63* (2023.01)
*H04N 5/262* (2006.01)
(Continued)

(52) U.S. Cl.
CPC ......... *H04N 23/633* (2023.01); *H04N 5/2628* (2013.01); *H04N 21/426* (2013.01); *H04N 23/80* (2023.01)

(58) Field of Classification Search
CPC .... H04N 23/633; H04N 23/80; H04N 5/2628; H04N 5/262; H04N 21/426
See application file for complete search history.

(56) References Cited

U.S. PATENT DOCUMENTS 6,313,877 B1 11/2001 Anderson
7,525,580 B2 4/2009 Yoshino
(Continued)

FOREIGN PATENT DOCUMENTS

JP 8-79578 3/1996
JP 11-289479 10/1999
(Continued)

OTHER PUBLICATIONS

Japanese Office Action dated Jun. 6, 2017 in Patent Application No. 2014-005577 (without English Translation).
(Continued)

*Primary Examiner* — Marly S Camargo
(74) *Attorney, Agent, or Firm* — Oblon, McClelland, Maier & Neustadt, L.L.P.

(57) ABSTRACT

There is provided a camera apparatus, including circuitry configured to: output a first image signal for displaying a first image, output a second image signal for displaying a second image. The second image signal is an image signal transmitted as a return signal. Further, the second image is an image that includes one of a location of a focus adjustment in the first image and an enlarged image corresponding to a part of the first image.

19 Claims, 6 Drawing Sheets

Related U.S. Application Data continuation of application No. 16/846,048, filed on Apr. 10, 2020, now Pat. No. 11,190,697, which is a continuation of application No. 16/105,696, filed on Aug. 20, 2018, now Pat. No. 10,652,468, which is a continuation of application No. 15/294,161, filed on Oct. 14, 2016, now Pat. No. 10,070,065, which is a continuation of application No. 14/571,646, filed on Dec. 16, 2014, now Pat. No. 9,503,657.

(51) Int. Cl.
*H04N 21/426* (2011.01)
*H04N 23/80* (2023.01)

(56) References Cited

U.S. PATENT DOCUMENTS

| | | | |
|---|---|---|---|
| 7,626,630 | B2 | 12/2009 | Nishino |
| 7,683,959 | B2 | 3/2010 | Moon |
| 7,952,620 | B2 | 5/2011 | Yoshino |
| 8,085,333 | B2 | 12/2011 | Kato |
| 8,274,592 | B2 | 9/2012 | Watkins et al. |
| 8,836,842 | B2 | 9/2014 | Sirpal |
| 9,146,589 | B2 | 9/2015 | Sirpal |
| 9,503,657 | B2 | 11/2016 | Ooba |
| 9,602,732 | B2 * | 3/2017 | Makinen ............... H04N 5/2628 |
| 9,706,106 | B2 | 7/2017 | Kang |
| 10,070,065 | B2 | 9/2018 | Ooba |
| 10,602,069 | B2 * | 3/2020 | Misawa ............... H04N 23/633 |
| 10,645,303 | B2 | 5/2020 | Kunishige |
| 10,652,468 | B2 | 5/2020 | Ooba |
| 10,819,947 | B2 | 10/2020 | Gomita et al. |
| 11,190,697 | B2 * | 11/2021 | Ooba ................... H04N 21/426 |
| 11,431,891 | B2 | 8/2022 | O'Leary |
| 2002/0171747 | A1 | 11/2002 | Niikawa |
| 2008/0304574 | A1 | 12/2008 | Fukuraha |
| 2010/0002022 | A1 | 1/2010 | Jones |
| 2011/0043651 | A1 | 2/2011 | Nonaka |
| 2011/0102621 | A1 | 5/2011 | Kim |
| 2012/0050578 | A1 | 3/2012 | Aoki |
| 2013/0038769 | A1 | 2/2013 | Xiaoping |
| 2013/0076964 | A1 | 3/2013 | Sirpal |
| 2013/0083222 | A1 | 4/2013 | Matsuzawa |
| 2013/0155308 | A1 | 6/2013 | Wu |
| 2013/0169849 | A1 | 7/2013 | Kato |
| 2014/0078241 | A1 | 3/2014 | Vaisburd |
| 2014/0232906 | A1 | 8/2014 | Ha |
| 2014/0347557 | A1 | 11/2014 | Gomita et al. |
| 2016/0248955 | A1 | 8/2016 | Richards et al. |
| 2018/0048812 | A1 | 2/2018 | Tanioka et al. |
| 2018/0143797 | A1 | 5/2018 | Levy |
| 2019/0028654 | A1 | 1/2019 | Misawa |
| 2019/0387158 | A1 | 12/2019 | Ono |

FOREIGN PATENT DOCUMENTS

| | | |
|---|---|---|
| JP | 2001-177742 A | 6/2001 |
| JP | 2004-297358 A | 10/2001 |
| JP | 2004312278 A | 11/2004 |
| JP | 2005341241 A | 12/2005 |
| JP | 2006-13983 A | 1/2006 |
| JP | 2006-67044 A | 3/2006 |
| JP | 2006-71901 A | 3/2006 |
| JP | 2007-88701 A | 4/2007 |
| JP | 2007-104187 | 4/2007 |
| JP | 2009-207191 A | 9/2009 |
| JP | 2010-192999 A | 9/2010 |
| JP | 2011-130275 A | 6/2011 |
| JP | 2011-259365 A | 12/2011 |
| JP | 2012-99889 A | 5/2012 |
| JP | 2012114541 A | 6/2012 |
| JP | 2013-34173 A | 2/2013 |
| JP | 5250146 B1 | 4/2013 |
| JP | 2015133681 A | 7/2015 |

OTHER PUBLICATIONS

Notification of Reason for Refusal issued in corresponding Japanese Application No. 2014-005577 dated Sep. 12, 2017 (with English translation).

Aikawa, "Sony 4K Camera—Omnidirectional Verification of AX1 & Z100," Video Salon, Genkosha Co., Ltd., Japan, Dec. 1, 2013, vol. 66, No. 6.

Japanese Office Action dated Dec. 11, 2018 in Patent Application No. 2018-031381.

Office Action dated Jan. 7, 2020 in Japan Patent Application No. 2019-052052.

* cited by examiner

FIG. 4

AT TIME WHEN USING CAMERA INTERNAL SIGNALS

| | DISPLAY UNIT 301 | | DISPLAY UNIT 302 | DESCRIPTION |
|---|---|---|---|---|
| (a) | | STANDARD | ENLARGED | STANDARD: IMAGE FRAME SAME AS MAIN LINE SIGNALS<br>ENLARGED: ENLARGED BY CUTTING OUT PART OF MAIN LINE SIGNALS<br>AIM OF FOCUSING OF FOCUS |
| (b) | | STANDARD | LEVEL COLOR CODING | STANDARD: IMAGE FRAME SAME AS MAIN LINE SIGNALS<br>COLOR CODING: DISPLAYING ARBITRARY LEVEL OF MAIN LINE SIGNALS WITH COLOR<br>EXAMPLE: VICINITY OF 100% = RED, VICINITY OF 60% = GREEN<br>AIM OF LEVEL ADJUSTMENT BY IRIS |
| (c) | | STANDARD | STATUS | STANDARD: IMAGE FRAME SAME AS MAIN LINE SIGNALS<br>STATUS: DISPLAYING MAIN LINE SIGNAL STATUS<br>EXAMPLE: FRAME RATE, SHUTTER OPENING ANGLE, ETC.<br>AIM OF USUALLY CONFIRMING IMAGING STATE |

FIG. 5

AT TIME WHEN USING RETURN SIGNALS

| | DISPLAY UNIT 301 | DISPLAY UNIT 302 | | DESCRIPTION |
|---|---|---|---|---|
| (a) | STANDARD | On AIR | | STANDARD: IMAGE FRAME SAME AS MAIN LINE SIGNALS<br>ON AIR: RETURN ON AIR IMAGE<br>AIM OF MANAGING ITS OWN IMAGING ANGLE, ETC., WHILE CONFIRMING ON AIR |
| (b) | STANDARD | FOCUS INSTRUCTION | R | STANDARD: IMAGE FRAME SAME AS MAIN LINE SIGNALS<br>INSTRUCTION: DISPLAYING LOCATION OF FOCUS ADJUSTMENT<br>AIM OF INSTRUCTING FOCUSING LOCATION OF FOCUS |
| (c) | STANDARD | ENLARGEMENT FOCUS INSTRUCTION | R | STANDARD: IMAGE FRAME SAME AS MAIN LINE SIGNALS<br>ENLARGEMENT AND INSTRUCTION: DISPLAYING LOCATION OF FOCUS ADJUSTMENT<br>AIM OF INSTRUCTING FOCUSING LOCATION OF FOCUS, AND MAKING FOCUSING EASIER BY ENLARGEMENT |
| (d) | STANDARD | STATUS | | STANDARD: IMAGE FRAME SAME AS MAIN LINE SIGNALS<br>STATUS: DISPLAYING STATE OF SYSTEM<br>EXAMPLE: FRAME RATE, ETC<br>CAN ALSO DISPLAY INFORMATION OF ARBITRARY IMAGING APPARATUS |

CAMERA APPARATUS

CROSS REFERENCE TO RELATED APPLICATIONS

This application is a continuation of and claims the benefit of priority under 35 U.S.C § 120 from U.S. application Ser. No. 17/400,050, filed Aug. 11, 2021, which is a continuation of U.S. application Ser. No. 16/846,048, filed Apr. 10, 2020, now U.S. Pat. No. 11,190,697, issued Nov. 30, 2021, which is a continuation of U.S. application Ser. No. 16/105,696, filed Aug. 20, 2018, now U.S. Pat. No. 10,652,468, issued May 12, 2020, which is a continuation of U.S. application Ser. No. 15/294,161, filed Oct. 14, 2016, now U.S. Pat. No. 10,070,065, issued Sep. 4, 2018, which is a continuation of U.S. application Ser. No. 14/571,646, filed Dec. 16, 2014, now U.S. Pat. No. 9,503,657, issued Nov. 22, 2016, which claims the benefit of Japanese Priority Patent Application JP 2014-005577, filed Jan. 16, 2014. The entire contents of each of the above-identified applications are incorporated herein by reference.

BACKGROUND

The present disclosure relates to a camera apparatus.

As a display of captured information in a camera apparatus, for example, there is a display with a lens focus state. In related art, emphatically displaying a high frequency component of a captured image is well known as this display method. Alternatively, transmitting a focal state of a lens to a photographer, by an enlarged scaling of an arbitrary necessary area, is well known as this display method. However, in the case of these display methods, switching and displaying is performed with captured main line signals in one display unit display, and so the actual state of the captured main line signals will not be able to be usually confirmed. Further, in related art, a method is proposed which combines a main line image and an enlarged image, and displays the combined image on one screen (for example, refer to JP 2013-341173A). However, in this case, it will be a display within one screen, and simultaneous confirmation of an actual main line image will not be able to be performed.

Further, as a display of imaging information in a camera apparatus, for example, there is a display of luminance levels of captured signals. Related to this display, while a region of a level specified in advance is identified by replacing with a color or a specific image, a captured main line will not be able to be usually confirmed.

Further, as a display of imaging information in a camera apparatus, for example, there is a display of status information at the time of imaging. Related to this display, while there are many cases in related art in which status information at the time of imaging is superimposed, for example, as characters on the top and bottom parts of a display screen of a captured image, the superimposed part will conceal the image, and so there will be cases where obstructions to imaging are produced.

Further, in related art, in the case of a system which sets an image of an arbitrary camera apparatus to an on air (ON AIR) image by using a plurality of camera apparatuses, the on air image can be confirmed by transmitting to each of the camera apparatuses as a return image. In this case, there will be one display unit for displaying at the imaging apparatus side, it may be necessary to switch signals, and operations may not be possible while confirming an on air image for a long time period.

SUMMARY

It is desirable for the present disclosure to be capable of displaying information which becomes effective when imaging, without having an influence on a confirmation display of captured main line signals.

The present technology provides a camera apparatus, including a first output section which outputs first image signals for displaying a first image corresponding to an image by captured image signals, and a second output section which outputs second image signals for displaying a second image having information which becomes effective when imaging.

In an embodiment of the present disclosure, first image signals for displaying a first image corresponding to an image by captured image signals are output, by a first output section. Further, second image signals for displaying a second image having information which becomes effective when imaging are output, by a second output section. For example, the first image signals and the second image signals may be generated automatically, and/or may be transmitted from a camera control unit as return signals.

Further, for example, the second image may be an enlarged image corresponding to a part of the first image. In this case, for example, the captured image signals may be image signals with a 4K resolution, the first image signals may be image signals with an HD resolution of a same image frame as the captured image signals, obtained by applying a down conversion process to the captured image signals, and the second image signals may be image signals with an HD resolution obtained by cutting out a part from the captured image signals.

Further, for example, the second image may be an image which shows a region corresponding to a prescribed luminance level range of the captured image signals within the first image with a color or specific luminance pattern specified in advance. Further, for example, the second image may be an image which includes information showing an imaging state. Further, for example, the second image may be an on air image.

Further, for example, the second image signals may be image signals transmitted from a camera control unit as return signals, and the second image may be an image in which a display is included which shows a location of a focus adjustment in the first image or an enlarged image corresponding to a part of the first image.

Further, the camera apparatus may further include a standard processing section which obtains the first image signals by processing the captured image signals, a signal reception section which receives the first image signals transmitted from a camera control unit as return signals, and a first selector which selectively extracts the first image signals obtained by the standard processing section or the first image signals received by the reception section, and transmits the extracted first image signals to the first output section. In this case, for example, at a time when there are control signals of the first selector from a camera control unit, the first selector may be controlled by switching based on these control signals.

Further, for example, a second selector may be additionally included which extracts any one type of second image signals from a plurality of types of second image signals and transmits the extracted second image signals to the second output section. In this case, for example, the second selector may selectively extract second image signals obtained by an enlargement processing section, second image signals obtained by a level display processing section, second image signals obtained by a status generation module or second image signals received by a signal reception section, and may transmit the extracted second image signals to the second output section. Also, in this case, at the time when there are control signals of the second selector from a camera control unit, the second selector may be controlled by switching based on the control signals.

Here, the second image signals obtained by the enlargement processing section are image signals for displaying, as the second image, an enlarged image corresponding to a part of the first image by processing the captured image signals. Further, the second image signals obtained by the level display processing section are image signals for displaying, as the second image, an image showing a region corresponding to a prescribed luminance level range of the captured image signals within the first image with a color or specific luminance pattern specified in advance, by processing the captured image signals. Further, the second image signals obtained by the status generation module are image signals for displaying, as the second image, an image which includes information showing an imaging state. Further, the second image signals received by the signal reception section are image signals transmitted from a camera control unit as return signals.

In such an embodiment of the present disclosure, first image signals for displaying a first image corresponding to an image by captured image signals are output, and second image signals for displaying a second image having information which becomes effective when imaging are output. Accordingly, it becomes possible to display information which becomes effective when imaging, without having an influence on a confirmation display of captured main line signals.

Further, another aspect of the present technology provides a camera apparatus including a camera main body, and two display units provided in the camera main body in a state in which a user is capable of observing the two display units at the same time. The camera main body has a first output section which outputs first image signals for displaying a first image corresponding to an image by captured image signals, and supplies the output first image signals to one of the two display units, and a second output section which outputs second image signals for displaying a second image having information which becomes effective when imaging, and supplies the output second image signals to the other of the two display units.

An embodiment of the present disclosure has two display units provided in a camera main body in a state in which a user is capable of observing both at the same time. Also, this camera main body has a first output section and a second output section. For example, the two display units may both be release type display units. Further, for example, the two display units may be a viewing type display unit and a release type display unit.

First image signals for displaying a first image corresponding to an image by captured image signals are output, and the output first image signals are supplied to one of the two display units, by the first output section of the camera main body. Further, second image signals for displaying a second image having information which becomes effective when imaging are output, and the output second image signals are supplied to the other of the two display units, by the second output section of the camera main body.

For example, at the time when the two display units are a viewing type display unit and a release type display unit, and the second image is an enlarged image corresponding to a part of the first image, the camera main body may supply the second image signals output from the second output section to the viewing type display unit. Further, for example, at the time when the two display units are a viewing type display unit and a release type display unit, and the second image is an image which shows a region corresponding to a prescribed luminance level range of the captured image signals within the first image with a color or specific luminance pattern specified in advance, the camera main body may supply the second image signals output from the second output section to the release type display unit.

In such an embodiment of the present disclosure, first image signals for displaying a first image corresponding to an image by captured image signals from the camera main body are output, and the output first image signals are supplied to one of the two display units, and second image signals for displaying a second image having information which becomes effective when imaging are output, and the output second image signals are supplied to the other of the two display units. Accordingly, it becomes possible to display information which becomes effective when imaging, without having an influence on a confirmation display of captured main line signals.

According to an embodiment of the present disclosure, it becomes possible to display information which becomes effective when imaging, without having an influence on a confirmation display of captured main line signals. Note that, the effect described in the present disclosure is not limited to that illustrated, and there may be additional effects.

BRIEF DESCRIPTION OF THE DRAWINGS

FIG. 4 is a figure which shows examples of a display of a display unit at the time when using camera internal signals;

FIG. 5 is a figure which shows examples of a display of a display unit when using return signals;

DETAILED DESCRIPTION OF THE EMBODIMENT(S)

Figure 1:
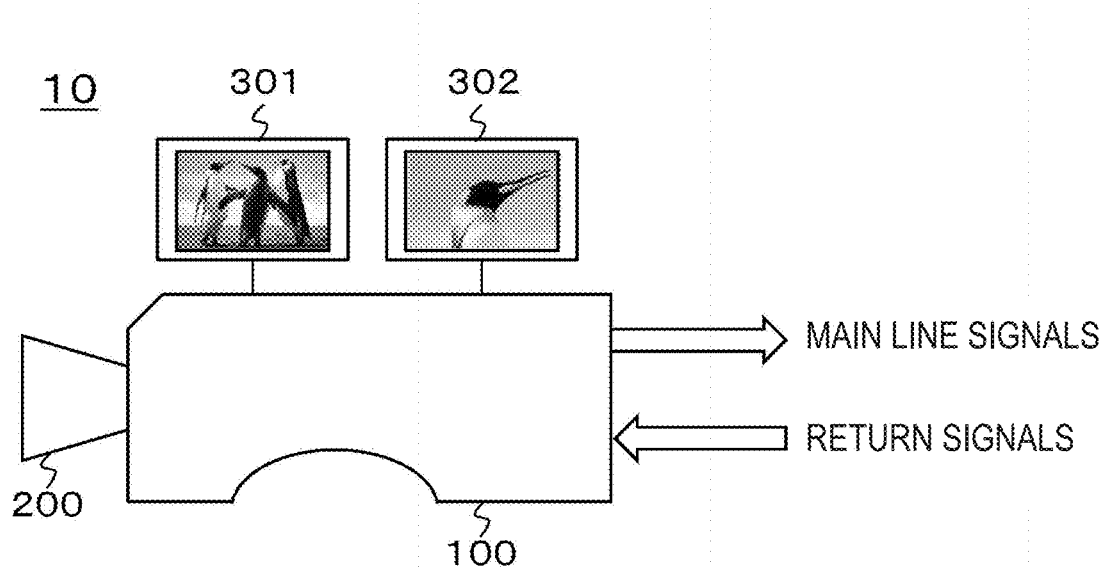
FIG. 1 is a figure which shows a basic configuration of a camera apparatus as an embodiment of the present disclosure.

Hereinafter, the modes for implementing the disclosure (hereinafter, called "embodiments") will be described. Note that, the description will be given in the following order.
1. The embodiments
2. Modified example 1. The Embodiments Configuration Example of the Camera Apparatus FIG. 1 shows a configuration example of a camera apparatus 10 as an embodiment of the present disclosure. This camera apparatus 10 is constituted by a camera main body 100, an imaging lens 200, and two display units 301 and 302. The imaging lens 200 is attached to a lens mount section (not illustrated) in front of the camera main body 100. The two display units 301 and 302 are attached to the camera main body 100 in a state in which a user (cameraman) is capable of observing both at the same time. The display units 301 and 302 are release type display units, for example, constituted by liquid crystal panels.

Captured image signals are output as main line signals from the camera main body 100. These main line signals are transmitted to a camera control unit (CCU), which is not illustrated. Further, return signals from the camera control unit are input to the camera main body 100. Note that, there will be cases where the main line signals are transmitted to a recording apparatus.

The camera main body 100 outputs first image signals for displaying a first image corresponding to an image by the captured image signals, and supplies the output first image signals to the display unit 301. Then, the display unit 301 displays the first image by these first image signals. It becomes possible for a user (cameraman) to usually perform confirmation of the captured main line signals, based on a display image (first image) of the display unit 301.

Further, the camera main body 100 outputs second image signals for displaying a second image having information which becomes effective when imaging, and supplies the output second image signals to the display unit 302. Then, the display unit 302 displays the second image by these second image signals. It becomes possible for a user (cameraman) to obtain information which becomes effective when imaging, based on a display image (first image) of the display unit 302.

The first image signals and the second image signals output from the camera main body 100 are generated within the camera main body 100, or are transmitted from the camera control unit as return signals.

For example, the display unit 302 displays an enlarged image corresponding to a part of the first image, for example, as a second image. In this case, by having this second image set so as to include a focus point, it becomes possible for a user (cameraman) to more accurately perform a focus adjustment (focusing) of the focus point, based on this second image.

Further, for example, the display unit 302 displays, as a second image, an image which shows a region corresponding to a prescribed luminance level range of the captured image signals within the first image with a color or specific luminance pattern specified in advance. In this case, it becomes possible for a user (cameraman) to easily perform an adjustment so that the luminance level of a prescribed region of the image falls within the prescribed luminance level range, based on this second image.

Further, for example, the display unit 302 displays, as a second image, an image which includes information showing an imaging state. For example, the information showing an imaging state is information such as a lens state, a camera setting state or the like, and more specifically is a frame rate, a shutter opening angle or the like. In this case, it becomes possible for a user (cameraman) to easily understand an imaging state, based on this second image.

Further, for example, the display unit 302 displays, as a second image, an on air image. In this case, the second image signals are image signals transmitted from the camera control unit. In this case, it becomes possible for a user (cameraman) to confirm an on air image, based on this second image.

Further, for example, the display unit 302 displays, as a second image, an image in which a display (marker) is included which shows a location of a focus adjustment in the first image or an enlarged image corresponding to a part of the first image. In this case, the second image signals are image signals transmitted from the camera control unit. In this case, it becomes possible for a user (cameraman) to easily understand an instruction of a focus adjustment location from the camera control unit side, based on this second image.

Figure 2:
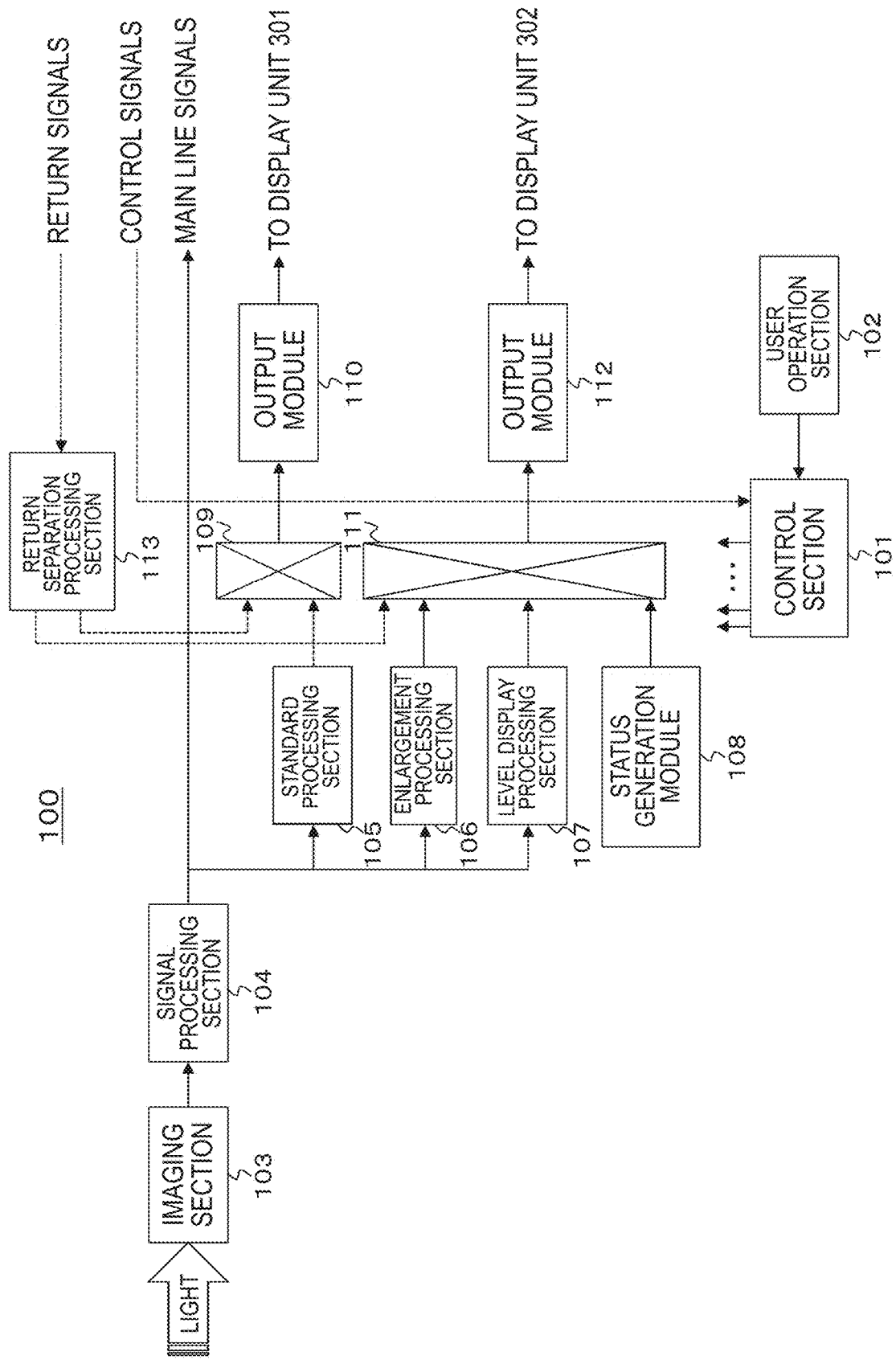
FIG. 2 is a figure which shows an internal module configuration example of a camera main body of the camera apparatus as an embodiment of the present disclosure.

FIG. 2 shows an internal module configuration example of the camera main body 100. The camera main body 100 has a control section 101, a user operation section 102, an imaging section 103, a signal processing section 104, a standard processing section 105, an enlargement processing section 106, a level display processing section 107, and a status generation module 108. Further, the camera main body 100 has a first selector 109, an output module 110, a second selector 111, an output module 112, and a return separation processing section 113.

The control section (camera CPU) 101 controls the operations of each of the sections of the camera main body 100. The user operation section 102 is connected to the control section 101, and constitutes a user interface for a user to perform various types of operations.

The imaging section 103 has an image sensor such as a Complementary Metal-Oxide Semiconductor (CMOS), a Charge Coupled Device (CCD) or the like, and outputs captured image signals with an HD resolution, a 4K resolution or the like. An image of a photographic subject is formed on an imaging surface of the image sensor, by the above described imaging lens 200. The signal processing section 104 applies a process such as a defect correction process for the captured image signals output from the imaging section 103, and outputs captured image signals (main line signals) as an output of the camera main body 100. These captured image signals are transmitted to a camera control unit, which is not illustrated.

The standard processing section 105 processes the captured image signals output from the signal processing section 104, and obtains first image signals with an HD resolution for displaying a first image of a same image frame with these captured image signals, which corresponds to an image by the captured image signals. In the case where the captured image signals are a RAW format which outputs an RGB heterologous sequence (layer sequence) as it is, for example, the standard processing section 105 converts the captured image signals into identical sequence RGB signals. Further, in the case where the captured image signals are high resolution image signals such as 4K resolution, the standard processing section 105 performs a down conversion.

The enlargement processing section 106 processes the captured image signals output from the signal processing section 104, and obtains second image signals with an HD resolution for displaying, as a second image, an enlarged image corresponding to a part of the first image. For example, in the case where the captured image signals are image signals with an HD resolution, the enlargement processing section 106 cuts out a part, and performs an up conversion. Further, for example, in the case where the captured image signals are image signals with a 4K resolution, or another type of high resolution, the enlargement processing section 106 cuts out a part corresponding to the HD resolution, and uses the cut out part as it is. In this case, there will be no reduction in resolution such as in the case where an up conversion process is performed.

In this case, a user (cameraman) is capable of arbitrarily setting a cut out position, that is, a position to be enlarged, by the user operation section 102. By setting this cut out position so as to include a focus point, for example, it becomes possible for a user (cameraman) to more accurately perform a focus adjustment (focusing) of the focus point, based on the enlarged image.

The level display processing section 107 processes the captured image signals output from the signal processing section 104, and obtains second image signals for displaying, as a second image, an image which shows a region corresponding to a prescribed luminance level range of the captured image signals within the first image with a color or specific luminance pattern specified in advance (for example, a zebra pattern, a crosshatch pattern or the like). In this case, a user (cameraman) is capable of arbitrarily setting a luminance level range, a color or a luminance pattern, by the user operation section 102.

The status generation module 108 obtains second image signals for displaying, as a second image, an image which includes information showing an imaging state (lens state, camera setting state or the like). This second image is an image, for example, which displays the information showing an imaging state as characters.

The return separation processing section 113 receives return signals transmitted from the camera control unit. The return separation processing section 113 separates and acquires first image signals and/or the second image signals included in the return signals. Similar to the above described first image signals obtained by the standard processing section 105, the first image signals separated and acquired from the return signals are image signals for displaying a first image corresponding to an image by the captured image signals. These first image signals are obtained by applying a process similar to that of the standard processing section 105 for the captured image signals transmitted from the camera main body 100 as main line signals at the camera control unit side.

Further, similar to the above described second image signals obtained by the enlargement processing section 106, the level display processing section 107, the status generation module 108 or the like, the second image signals separated and acquired from the return signals are image signals for displaying a second image having information which becomes effective when imaging. These second image signals are obtained, for example, based on the captured image signals transmitted from the camera main body 100 as main line signals at the camera control unit side.

For example, such second image signals separated and acquired from the return signals are image signals for displaying, as a second image, an on air image. Further, for example, such second image signals separated and acquired from the return signals are image signals for displaying, as a second image, an image in which a display (marker) is included which shows a location of a focus adjustment in the first image or an enlarged image corresponding to a part of the first image, or an enlarged image which shows a location of a focus adjustment. Further, for example, such second image signals separated and acquired from the return signals are image signals for displaying, as a second image, an image which includes information showing an imaging state.

The first selector 109 selectively extracts the first image signals obtained by the standard processing section 105 or the first image signals obtained by the return separation processing section 113, and supplies the extracted first image signals to the output module 110. The output module 110 converts the first image signals supplied from the first selector 109 into signals of a signal format suitable for a digital interface to which the display unit 301 is adapted, for example, SDI signals, and transmits the converted first image signals to the display unit 301.

The second selector 111 selectively extracts the second image signals obtained by the enlargement processing section 106, the second image signals obtained by the level display processing section 107, the second image signals obtained by the status generation module 108 or the second image signals obtained by the return separation processing section 113, and outputs the extracted second image signals to the output module 112. The output module 112 converts the second image signals supplied from the second selector 111 into signals of a signal format suitable for a digital interface to which the display unit 302 is adapted, and transmits the converted second image signals to the display unit 302.

The signal selections in the first selector 109 and the second selector 111 are controlled by the control section 101. In this case, at the time when there are selector control signals from the camera control unit, these signal selections are controlled based on these control signals.

Figure 3:
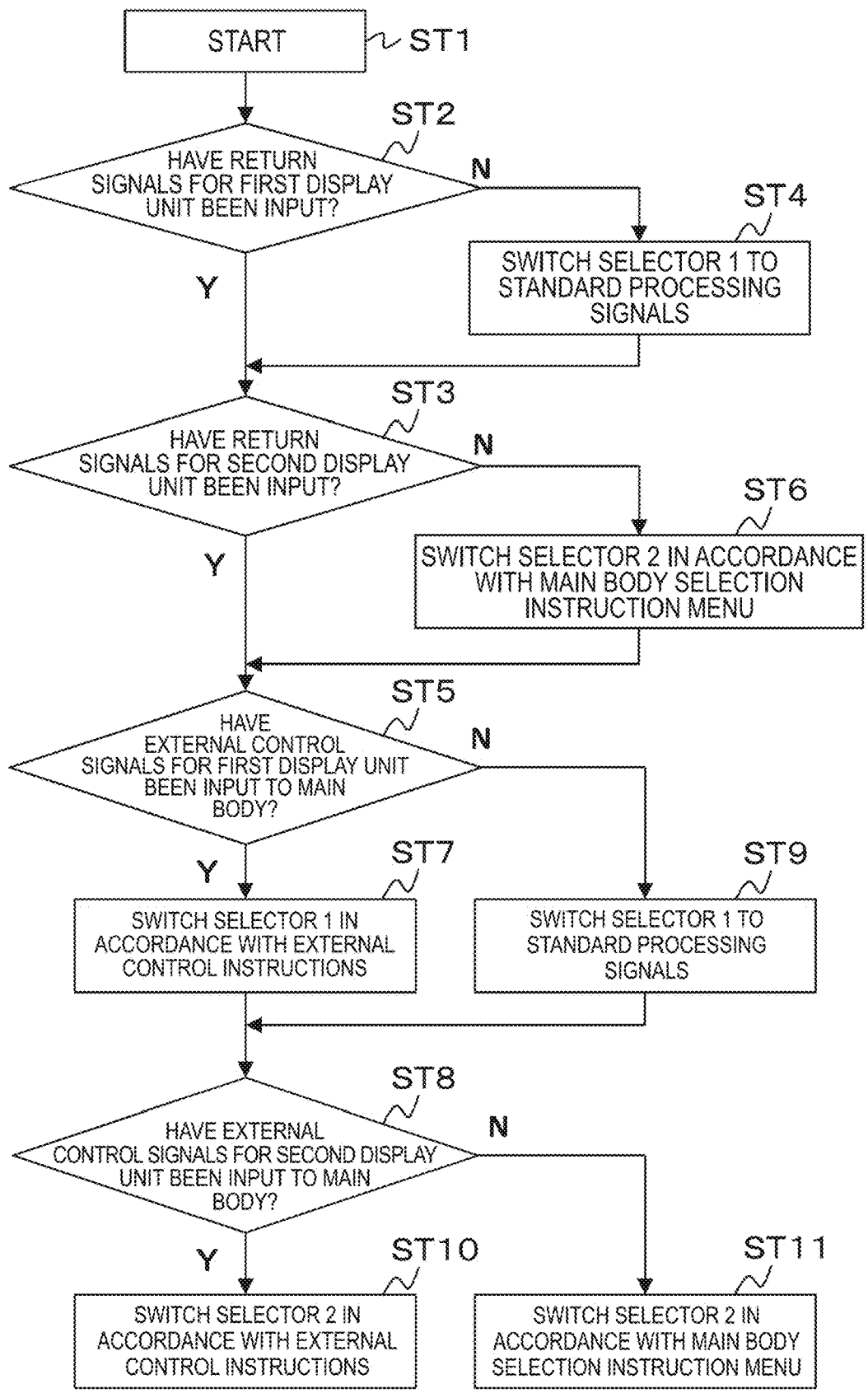
FIG. 3 is a flow chart which shows an example of a switching control process of a first selector and a second selector in a control section.

The flow chart of FIG. 3 shows an example of a switching control process of the first selector 109 and the second selector 111 in the control section 101. In step ST1, the control section 101 starts the control process, and after this, moves to the process of step ST2.

In this step ST2, the control section 101 determines whether or not return signals for the first display unit have been input, that is, whether or not first image signals are included in the return signals. At the time when first image signals are included in the return signals, the control section 101 moves to the process of step ST3. On the other hand, at the time when first image signals are not included in the return signals, in step ST4, the control section 101 switches a selector 1 to standard processing signals, that is, switches the first selector 109 so as to extract the first image signals obtained by the standard processing section 105. After this, the control section 101 moves to the process of step ST3.

In this step ST3, the control section 101 determines whether or not return signals for the second display unit have been input, that is, whether or not second image signals are included in the return signals. At the time when second image signals are included in the return signals, the control section 101 moves to the process of step ST5. On the other hand, at the time when second image signals are not included in the return signals, in step ST6, the control section 101 switches a selector 2 in accordance with a main body selection instruction menu, that is, switches the second selector 111 so as to extract the second image signals shown by the main body selection instruction menu. After this, the control section 101 moves to the process of step ST5.

In this step ST5, the control section 101 determines whether or not external control signals for the first display unit have been input to the camera main body 100 from the camera control unit. At the time when external control signals for the first display unit have been input, in step ST7, the control section 101 switches the selector 1, in accordance with an external control instruction, that is, switches the first selector 109 so as to extract the first image signals shown by the external control signals. Afterwards, the control section 101 moves to the process of step ST8.

On the other hand, at the time when external control signals for the first display unit have not been input in step ST5, in step ST9, the control section 101 switches the selector 1 to standard processing signals, that is, switches the first selector 109 so as to extract the first image signals obtained by the standard processing section 105. Afterwards, the control section 101 moves to the process of step ST8.

In this step ST8, the control section 101 determines whether or not external control signals for the second display unit have been input to the camera main body 100 from the camera control unit. At the time when external control signals for the second display unit have been input, in step ST10, the control section 101 switches the selector 2, in accordance with an external control instruction, that is, switches the second selector 111 so as to extract the second image signals shown by the external control signals.

On the other hand, at the time when external control signals for the second display unit have not been input in step ST8, in step ST11, the control section 101 moves to the process of step ST11. In this step ST11, the control section 101 switches the selector 2 in accordance with a main body selection instruction menu, that is, switches the second selector 111 so as to extract the second image signals shown by the main body selection instruction menu.

The operations of the camera main body 100 shown in FIG. 2 will be simply described. The image signals output from the imaging section 103 are supplied to the signal processing section 104, and a process such as a defect correction process is applied. The captured image signals obtained by this signal processing section 104 are output from the camera main body 100 as main line signals, and are transmitted, for example, to the camera control unit.

Further, the captured image signals obtained by the signal processing section 104 are supplied to the standard processing section 105, the enlargement processing section 106 and the level display processing section 107. In the standard processing section 105, the captured image signals are processed, and first image signals with an HD resolution are obtained for displaying a first image of a same image frame as these captured image signals, which corresponds to an image by these captured image signals. These first image signals are supplied to the first selector 109.

Further, in the enlargement processing section 106, the captured image signals output from the signal processing section 104 are processed, and second image signals with an HD resolution are obtained for displaying, as a second image, an enlarged image corresponding to a part of the first image. These second image signals are supplied to the second selector 111.

Further, in the level display processing section 107, the captured image signals output from the signal processing section 104 are processed, and second image signals are obtained for displaying, as a second image, an image which shows a region corresponding to a prescribed luminance level range of the captured image signals within the first image with a color or specific luminance pattern specified in advance. These second image signals are supplied to the second selector 111.

Further, in the status generation module 108, second image signals are obtained for displaying, as a second image, an image which includes information showing an imaging state (a lens state, a camera setting state or the like). These second image signals are supplied to the second selector 111.

Further, return signals transmitted from a camera control unit (CCU) are received by the return separation processing section 113. Also, in this return separation processing section 113, first image signals and/or second image signals included in the return signals are separated and acquired. The first image signals are supplied to the first selector 109, and the second image signals are supplied to the second selector 111.

In the first selector 109, the first image signals obtained by the standard processing section 105 or the first image signals obtained by the return separation processing section 113 are selectively extracted, and the extracted first image signals are supplied to the output module 110. In the output module 110, these first image signals are converted into signals of a prescribed signal format to which the display unit 301 corresponds (for example, SDI signals or the like), and the converted first image signals are supplied to the display unit 301. In this way, a first image corresponding to an image by the captured image signals is displayed on the display unit 301, by the first image signals extracted by the first selector 109.

In the second selector 111, the second image signals obtained by the enlargement processing section 106, the second image signals obtained by the level display processing section 107, the second image signals obtained by the status generation module 108 or the second image signals obtained by the return separation processing section 113 are selectively extracted, and the extracted second image signals are supplied to the output module 112. In the output module 112, these second image signals are converted to signals of a prescribed signal format to which the display unit 302 corresponds (for example, SDI signals or the like), and the converted second image signals are supplied to the display unit 302. In this way, a second image which includes information showing an imaging state is displayed on the display unit 302, by the second image signals extracted by the second selector 111.

FIG. 4 shows examples of a display of the display units 301 and 302 in the case where either the second image signals from the enlargement processing section 106, the second image signals from the level display processing section 107 or the second image signals from the status generation module 108 are extracted by the second selector 111, that is, at the time when using camera internal signals.

In this case, in the second selector 111, either the first image signals from the standard processing section 105 or the first image signals from the return separation processing section 113 are extracted, and a standard image, that is, a first image corresponding an image by captured image signals (main line signals), is displayed on the display unit 301.

FIG. 4(a) shows an example of a display of the display units 301 and 302 in the case where second image signals from the enlargement processing section 106 are extracted by the second selector 111. An enlarged image corresponding to a part of a standard image (first image) displayed on the display unit 301 is displayed, as a second image, on the display unit 302. This enlarged image is displayed, for example, with the aim of focusing the focus.

FIG. 4(b) shows an example of a display of the display units 301 and 302 in the case where second image signals from the level display processing section 107 are extracted by the second selector 111. An image in which a region corresponding to a prescribed luminance level range of captured image signals within a standard image (first image) displayed on the display unit 301 is displayed with a color or specific luminance pattern specified in advance (for example, a zebra pattern, a crosshatch pattern or the like) is displayed, as a second image, on the display unit 302. For example, a luminance level in the vicinity of 100% is displayed in red (refer to the arrow P), and a luminance level in the vicinity of 60% is displayed in green (refer to the arrow Q). This level display image is displayed, for example, with the aim of a luminance level adjustment by an iris.

FIG. 4(c) shows an example of a display of the display units 301 and 302 in the case where second image signals from the status generation module 108 are extracted by the second selector 111. An image which includes a main line signal status display (frame rate, shutter opening angle or the like) is displayed on the display unit 302. This image is displayed, for example, with the aim of usually confirming an imaging state.

FIG. 5 shows examples of a display of the display units 301 and 302 in the case where second image signals from the return separation processing section 113 are extracted by the second selector 111, that is, at the time when using return signals. In this case, in the second selector 111, either the first image signals from the standard processing section 105 or the first image signals from the return separation processing section 113 are extracted, and a standard image, that is, a first image corresponding to an image by captured image signals (main line signals), is displayed on the display unit 301.

FIG. 5(a) shows an example of a display of the display units 301 and 302 in the case where second image signals are obtained, by the return separation processing section 113, for displaying an on air (ON AIR) image. An on air image is displayed on the display unit 302. This on air image is displayed with the aim of managing its own imaging angle or the like while confirming on air.

FIG. 5(b) shows an example of a display of the display units 301 and 302 in the case where second image signals are obtained, by the return separation processing section 113, for displaying an image in which a display (marker) is included which shows a location of a focus adjustment in a standard image (first image) displayed on the display unit 301. An image having a rectangular frame (refer to the arrow R) which shows a location of a focus adjustment, for example, is displayed on the display unit 302. This image is displayed with the aim of instructing a specific focusing location of the focus from a camera control unit side.

FIG. 5(c) shows an example of a display of the display units 301 and 302 in the case where second image signals are obtained, by the return separation processing section 113, for displaying an image in which a display (marker) is included which shows a location of a focus adjustment in an enlarged image of a standard image (first image) displayed on the display unit 301. An enlarged image having a rectangular frame (refer to the arrow R) which shows a location of a focus adjustment, for example, is displayed on the display unit 302. This image is also displayed with the aim of instructing a specific focusing location of the focus from a camera control unit side. By displaying an enlarged image, focusing by a user (cameraman) becomes easy.

FIG. 5(d) shows an example of a display of the display units 301 and 302 in the case where second image signals are obtained, by the return separation processing section 113, for displaying an image which includes information showing an imaging state. An image which includes a state (frame rate or the like) of the system, for example, is displayed on the display unit 302. In this case, it becomes possible to display not only information of the camera main body 100 itself, but also information of an arbitrary imaging apparatus connected to a camera control unit. This image is displayed with the aim of usually confirming information of the camera main body 100 itself and another imaging apparatus.

In the camera main body 100 shown in FIG. 1 and FIG. 2, first image signals for displaying a first image corresponding to an image by captured image signals are output and the output first image signals are supplied to the display unit 301, and second image signals for displaying a second image having information which becomes effective when imaging are output and the output second image signals are supplied to the display unit 301. Accordingly, it becomes possible to display information which becomes effective when imaging, without having an influence on a confirmation display of captured main line signals.

For example, in a lens focus operation, focusing becomes easy, even if there is a display pixel restriction of the display unit side, by an enlarged image of a necessary area, while confirming the natural entire image which becomes a main line. Further, by using a return image generated by a camera control unit (external apparatus), instructions of a focus area can be performed smoothly.

Further, for example, in an iris operation of a lens, luminance information of an arbitrary necessary area can be simultaneously confirmed and operated, while confirming the natural entire image which becomes a main line. Further, for example, it becomes possible to usually understand various types of information of an imaging apparatus in imaging, while confirming a natural image which becomes a main line.

2. Modified Example

Figure 6:
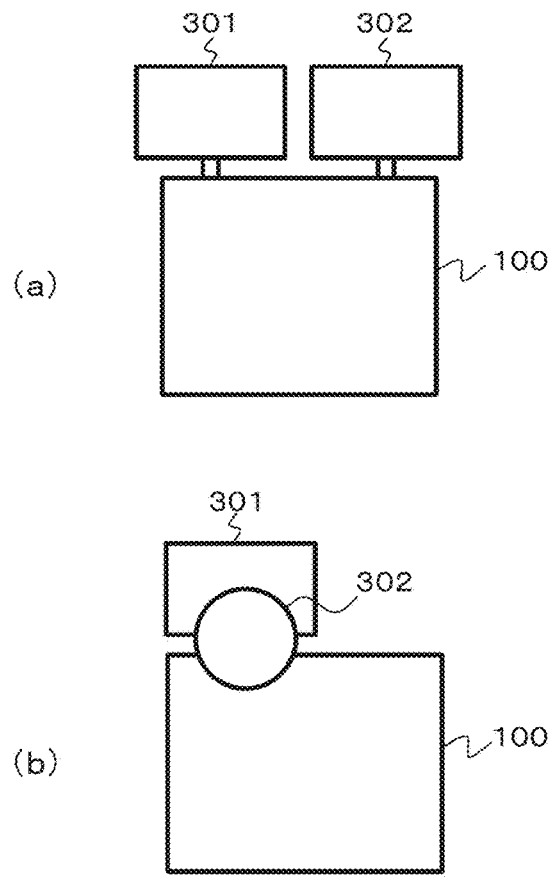
FIG. 6 is a figure for describing the types (release type and viewing type) of two display units.

Note that, as shown in FIG. 6(a), an example has been shown in the above described embodiments in which two release type display units 301 and 302 are included in the camera main body 100. However, a case can also be considered in which both the display units 301 and 302 are a viewing type. In this case, it will be a configuration in which both the display units 301 and 302 are capable of being viewed, by having a user (cameraman) look with each of his or her eyes.

Figure 7:
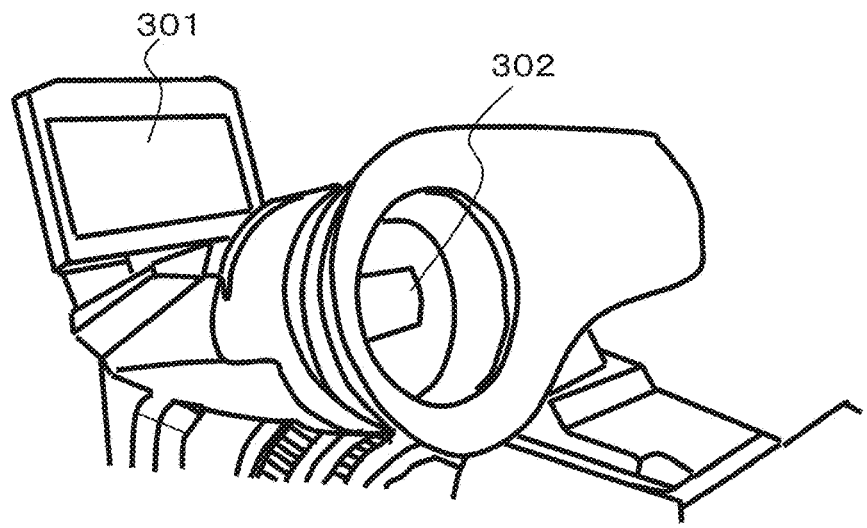
FIG. 7 is a figure which shows a specific arrangement example of the display units in the case where one of the two display units is a release type and the other is a viewing type.

Further, as shown in FIG. 6(b), a case can also be considered in which one out of the two display units 301 and 302 is a release type, and the other is a viewing type. FIG. 7 shows a specific arrangement example of the display units 301 and 302 in this case. While an example is shown, in the illustrated example, in which the display unit 301 is a release type and the display unit 302 is a viewing type, they may be reversed. Note that, in this case, according to the contents of a second image, a configuration can also be considered in which this second image is switched between being displayed by a release type and being displayed by a viewing type.

For example, at the time when second image signals selected by the second selector 111 are image signals which display an enlarged image, these image signals are supplied to the viewing type display unit. Further, for example, at the time when second image signals selected by the second selector 111 are a level display image, these image signals are supplied to the release type display unit.

Further, while a description has been made in the above described embodiments in which the display units 301 and 302 are display units with an HD resolution, it is not limited to this. Further, while an example has been shown in the above described embodiments in which the two display units 301 and 302 are connected to the camera main body 100, a configuration can also be considered in which three or more display units are connected to the camera main body 100. In this case, it becomes possible for two or more images having information which becomes effective when imaging to be simultaneously displayed, in a state in which a standard image (first image) is usually displayed. Further, while an example has been shown in the above described embodiments in which an image which has information showing an imaging state is independently displayed, displaying information showing an imaging state superimposed on an enlarged image or a level display image can also be considered.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) A camera apparatus, including:
  a first output section which outputs first image signals for displaying a first image corresponding to an image by captured image signals; and
  a second output section which outputs second image signals for displaying a second image having information which becomes effective when imaging.

(2) The camera apparatus according to (1),
  wherein the first image signals and the second image signals are generated in the camera apparatus and/or are transmitted from a camera control unit as return signals.

(3) The camera apparatus according to (1) or (2),
  wherein the second image is an enlarged image corresponding to a part of the first image.

(4) The camera apparatus according to (3),
  wherein the captured image signals are image signals with a 4k resolution,
  wherein the first image signals are image signals of a same image frame as the captured image signals, obtained by applying a down conversion process to the captured image signals, and
  wherein the second image signals are image signals with an HD resolution obtained by cutting out a part from the captured image signals.

(5) The camera apparatus according to (1) or (2),
  wherein the second image is an image which shows a region corresponding to a prescribed luminance level range of the captured image signals within the first image with a color or a specific luminance pattern specified in advance.

(6) The camera apparatus according to (1) or (2),
  wherein the second image is an image which includes information showing an imaging state.

(7) The camera apparatus according to (1) or (2),
  wherein the second image is an on air image.

(8) The camera apparatus according to (1) or (2),
  wherein the second image signals are image signals transmitted from a camera control unit as return signals, and
  wherein the second image is an image in which a display is included which shows a location of a focus adjustment in the first image or an enlarged image corresponding to a part of the first image.

(9) The camera apparatus according to (1) or (2), further including:
  a standard processing section which obtains the first image signals by processing the captured image signals;
  a signal reception section which receives the first image signals transmitted from a camera control unit as return signals; and
  a first selector which selectively extracts the first image signals obtained by the standard processing section or the first image signals received by the reception section, and transmits the extracted first image signals to the first output section.

(10) The camera apparatus according to (9),
  wherein, at a time when there are control signals of the first selector from a camera control unit, the first selector is controlled by switching based on the control signals.

(11) The camera apparatus according to (1) or (2), further including:
  a second selector which extracts any one type of second image signals from a plurality of types of second image signals and transmits the extracted second image signals to the second output section.

(12) The camera apparatus according to (11), further including:
  an enlargement processing section which obtains second image signals for displaying, as the second image, an enlarged image corresponding to a part of the first image by processing the captured image signals;
  a level display processing section which obtains second image signals for displaying, as the second image, an image showing a region corresponding to a prescribed luminance level range of the captured image signals within the first image with a color or a specific luminance pattern specified in advance, by processing the captured image signals;
  a status generation module which obtains second image signals for displaying, as the second image, an image which includes information showing an imaging state; and
  a signal reception section which receives the second image signals transmitted from a camera control unit as return signals,
  wherein the second selector selectively extracts the second image signals obtained by the enlargement processing section, the second image signals obtained by the level display processing section, the second image signals obtained by the status generation module or the second image signals received by the signal reception section, and transmits the extracted second image signals to the second output section.

(13) The camera apparatus according to (12),
  wherein, at a time when there are control signals of the second selector from a camera control unit, the second selector is controlled by switching based on the control signals.

(14) A camera apparatus, including:
  a camera main body; and
  two display units provided in the camera main body in a state in which a user is capable of observing the two display units at the same time,
  wherein the camera main body has
  a first output section which outputs first image signals for displaying a first image corresponding to an image by captured image signals, and supplies the output first image signals to one of the two display units, and
  a second output section which outputs second image signals for displaying a second image having information which becomes effective when imaging, and supplies the output second image signals to the other of the two display units.

(15) The camera apparatus according to (14),
  wherein the two display units are both release type display units.

(16) The camera apparatus according to (14),
wherein the two display units are a viewing type display unit and a release type display unit.
(17) The camera apparatus according to (16),
wherein, at a time when the second image is an enlarged image corresponding to a part of the first image, the camera main body supplies the second image signals output from the second output section to the viewing type display unit.
(18) The camera apparatus according to (16) or (17),
wherein, at a time when the second image is an image which shows a region corresponding to a prescribed luminance level range of the captured image signals within the first image with a color or a specific luminance pattern specified in advance, the camera main body supplies the second image signals output from the second output section to the release type display unit.

What is claimed is:

1. A camera apparatus, comprising:
   display; and
   circuitry configured to
   output a first image signal corresponding to a first image,
   select a second image signal corresponding to a second image and thereafter output the selected second image signal,
   wherein
   the first image signal is an image signal having a resolution of 4K or more, and
   the second image signal is a size modified image signal generated based on the first image signal and displayed on the display.

2. The camera apparatus according to claim 1, wherein the size modified image signal is an enlarged image.

3. The camera apparatus according to claim 1, wherein first image signal and the second image signal have a same view angle.

4. The camera apparatus according to claim 1, wherein the second image signal has a resolution of high definition (HD) or greater.

5. The camera apparatus according to claim 1, wherein the circuitry is further configured to arbitrarily set a cut out position as the size modification.

6. The camera apparatus according to claim 1, wherein the modified image signal is an enlarged image that includes a location of a focus adjustment in the first image signal.

7. The camera apparatus according to claim 6, wherein the enlarged image is obtained by cutting out a part from a captured image corresponding to the captured image signal.

8. The camera apparatus according to claim 1, wherein the second image signal is selected as one type of image signal from a plurality of types of image signals including prescribed luminance level range of the captured image signal with a color or a specific luminance pattern specified in advance.

9. The camera apparatus according to claim 1, wherein the second image signal is selected from a plurality of types of modifications based on a selection instruction.

10. A method, comprising:
    outputting, via circuitry, a first image signal corresponding to a first image;
    selecting, via the circuitry, a second image signal corresponding to a second image
    and thereafter outputting the selected second image signal,
    wherein the first image signal is an image signal having a resolution of 4K or more, and
    wherein the second image signal is a size modified image signal generated based on the first image signal and displayed on the display.

11. The method according to claim 10, wherein the size modified image signal is an enlarged image.

12. The method according to claim 10, wherein first image signal and the second image signal have a same view angle.

13. The method according to claim 10, wherein the second image signal has a resolution of high definition (HD) or greater.

14. The method according to claim 10, wherein the circuitry is further configured to arbitrarily set a cut out position as the size modification.

15. The method according to claim 10, wherein the modified image signal is an enlarged image that includes a location of a focus adjustment in the first image signal.

16. The method according to claim 15, wherein the enlarged image is obtained by cutting out a part from a captured image corresponding to the captured image signal.

17. The method according to claim 10, wherein the second image signal is selected as one type of image signal from a plurality of types of image signals including prescribed luminance level range of the captured image signal with a color or a specific luminance pattern specified in advance.

18. The method according to claim 10, wherein the second image signal is selected from a plurality of types of modifications based on a selection instruction.

19. A non-transitory computer readable medium having stored thereon a program that when executed by circuitry causes the circuitry to implement a method, comprising:
    outputting a first image signal corresponding to a first image;
    selecting a second image signal corresponding to a second image and thereafter
    outputting the selected second image signal,
    wherein the first image signal is an image signal having a resolution of 4K or more, and
    wherein the second image signal is a size modified image signal generated based on the first image signal and displayed on the display.

* * * * *